Dec. 11, 1956 O. H. SCHADE, SR 2,773,413
APPARATUS FOR AND METHOD OF MEASURING THE
QUALITY OF OPTICAL DEVICES
Filed April 1, 1955 3 Sheets-Sheet 3

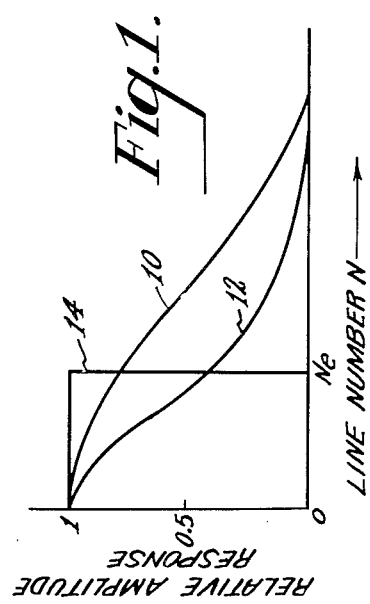
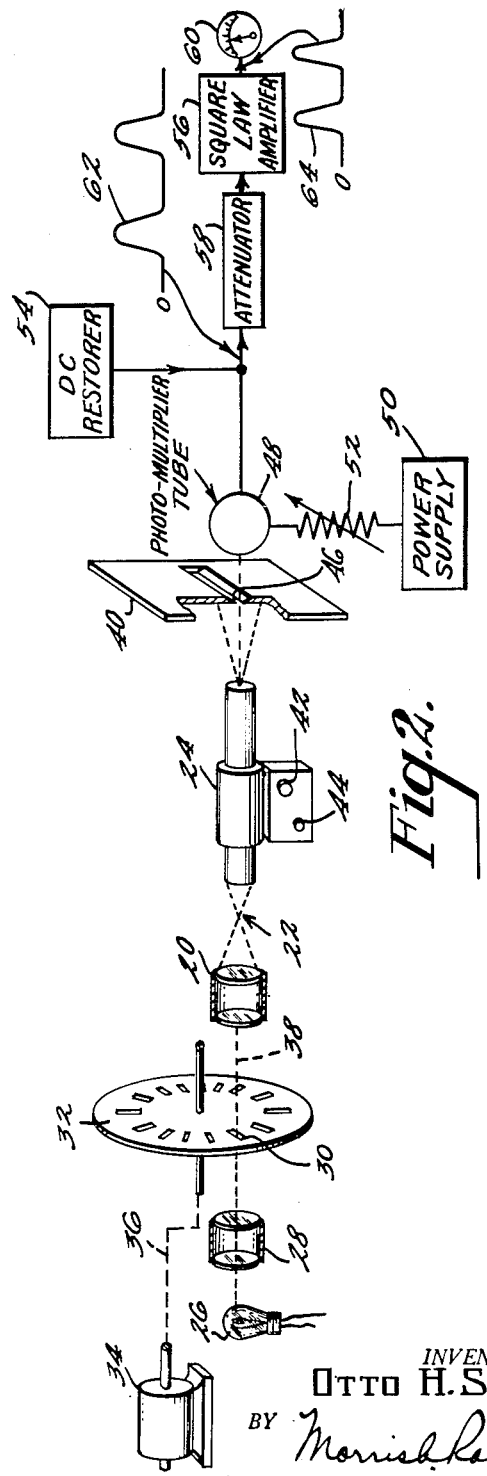

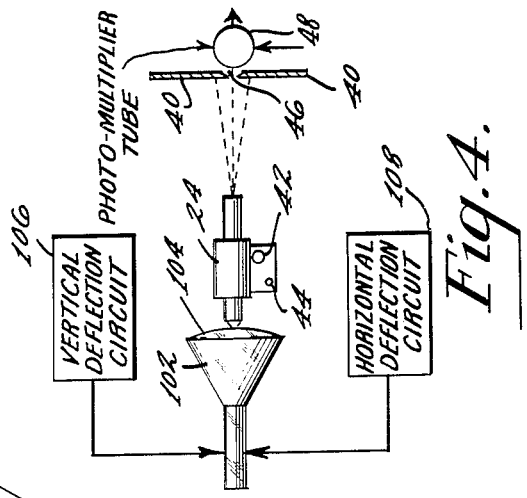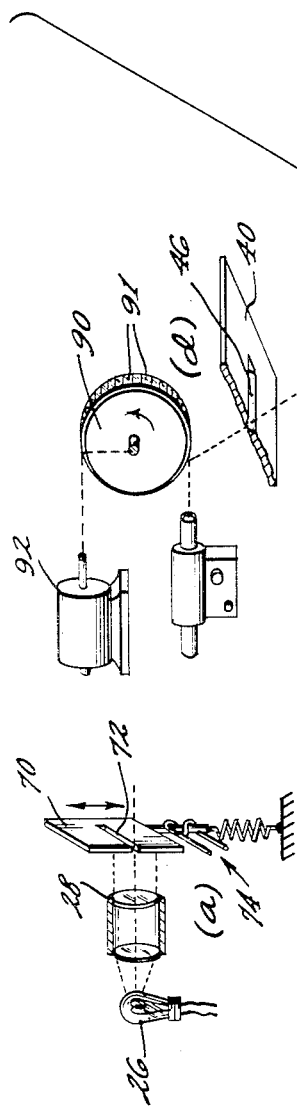

INVENTOR.
OTTO H. SCHADE
BY
ATTORNEY.

United States Patent Office 2,773,413
Patented Dec. 11, 1956

2,773,413

APPARATUS FOR AND METHOD OF MEASURING THE QUALITY OF OPTICAL DEVICES

Otto H. Schade, Sr., West Caldwell, N. J., assignor to Radio Corporation of America, a corporation of Delaware Application April 1, 1955, Serial No. 498,682

9 Claims. (Cl. 88—14)

This invention relates generally to apparatus for and methods of determining the quality of optical devices, and more particularly to apparatus for and methods of measuring the optical equivalent passband as a function of the relative image sharpness produced by an optical device under test. The optical equivalent passband will be referred to hereinafter by the symbol "$N_e$." The apparatus and methods of the present invention are useful in providing means for determining the quality of optical devices, such as lenses, films and kinescopes, for example, by a single number representation. The apparatus and methods of the present invention also lend themselves easily to the production testing and general investigation of all types of optical devices.

It has been proposed to determine the quality of an optical device, such as a lens, by obtaining its aperture response curve, that is, its sine-wave spectrum. A detailed explanation of the derivation of the sine-wave spectrum will be omitted because it forms no part of the present invention and because this is explained by the inventor in the "Journal of the Society of Motion Picture and Television Engineers," March 1952, volume 58, Number 3, pages 181–222. Briefly, to obtain the sine-wave spectrum of a lens, at a particular lens stop, the lens is set up to form a reduced image of an optical sine-wave test pattern. The sine-wave image is scanned by the slit-aperture of a microphotometer in a direction perpendicular to the sine-waves. The line-number of the sine-wave patterns, that is, the number of half wavelengths of the sine-wave patterns per unit of length, is varied and the amplitude of the sinusoidal light flux variations passing through the aperture of the microphotometer is measured. The fineness of each of the sine-wave patterns is expressed by a line-number N, and the amplitude of the sinusoidal light flux passing through the microphotometer aperture at each line-number is expressed in relative units by letting the maximum sine-wave response equal unity. The sine-wave response of the lens is determined by the size and intensity distribution of its point-image, which is its resolving, or sampling, aperture. For patterns of low-line numbers, the resolving aperture of the lens is very small compared to the width of the test pattern line. The response output is then a wave of substantially full amplitude. However, as the lines or half-cycles become narrower, the resolving aperture covers more than one-half cycle in any one position so that the variation in light output gets smaller and smaller as the half-cycles become narrower. When the resolving aperture point-image spans a certain amount of half-cycles, the output becomes constant. Therefore, the aperture response of the lens, which is a measure of the variation, goes to zero. The aperture response curve of a lens, that is, its sine-wave spectrum, is a means of defining the quality of the lens.

While the aperture response curve, that is, the sine-wave spectrum, of a lens, for example, is a function of its quality, it represents a curve comprising a plurality of co-ordinate points. This curve changes as a function of lens stops, the color of light and with the position of the observed point in the image field. The concept of a single number representation of image quality for one specified condition would, therefore, be a great simplification compared to the aperture response curve. Any such single number representation will obviously be an approximation of the data furnished by a response curve. In accordance with the present invention, a single quality number $N_e$, is designated as that line-number at which a rectangular response curve having a sharp cut-off would contain the same sine-wave energy as is contained by the aperture response curve. Since the aperture response curve is one in which amplitude is plotted as an ordinate and line number is plotted as an abscissa, the aperture response curve must be squared at each point to give energy vs. line-number; and the equivalent sharp cut-off curve extends to that line-number which encompasses the same area as that enclosed by the squared aperture response curve. This line-number is called the optical equivalent passband $N_e$. It is believed that the $N_e$ concept of the present invention is as suitable a single number representation of quality as can be found, since it is based on the response of the optical system over the whole detailed range. The measure $N_e$ is more influenced by the high amplitude portions of the aperture response curve than by the low amplitude portions.

Accordingly, it is a principal object of the present invention to provide novel apparatus for and methods of measuring the optical equivalent passband $N_e$ of optical devices.

Another object of the present invention is to provide novel methods of and apparatus for measuring the quality of optical devices, such as lenses, kinescopes, and films by a single number representation.

A further object of the present invention is to provide novel means for measuring of the optical equivalent passband $N_e$ of optical devices in a manner easily adapted for production testing and/or the general investigation of the optical devices.

Still a further object of the present invention is to provide novel apparatus for measuring the optical equivalent passband $N_e$, of optical devices, that is relatively simple in structure, easy to operate and highly efficient in use.

These and, perhaps, further objects of the present invention are attained in a method whereby an image of a mathematically fine line object, termed a line-image, is formed with the optical device whose quality is to be tested. The line-image is converted into a series of electrical impulses by means of repetitively scanning the line-image over an aperture slit in an opaque screen in front of a photo-sensitive element. The series of electrical impulses is squared and the average value of the squared impulses are measured by a meter. The gain of the photo-sensitive element is adjusted to give impulses whose squared average value is proportional to the actual optical equivalent passband $N_e$ of the optical device under test.

To test a lens, for example, in accordance with the method of the present invention, apparatus is to provide to image a strongly illuminated fine slit as a line-image. The slit is fine enough so that it is not resolved by the lens under test and thus approaches a mathematical line-object so far as the lens is concerned. The line-image is magnified by a microscope and projected onto an analyzing slit in front of the photo-sensitive element, such as a multiplier photo tube. The line-image is moved at a uniform velocity over the analyzing slit, by one of various means, as by a slotted-wheel. The multiplier photo tube output is a sequence of electrical impulses with amplitudes corresponding to the line-transmittance (impulse response) of the lens under test. These impulses are squared by a square-law amplifier and the integral, that is, average value, of the squared impulses is measured with a D.-C. meter. The reading so obtained is proportional to the optical equivalent passband $N_e$. The true $N_e$ value of the lens may be obtained by calibrating the apparatus in a manner to be described.

The novel features of the present invention, as well as the invention itself, will be understood in detail from the following description, when considered in connection with the accompanying drawings in which similar reference characters represent similar parts, and in which:

Fig. 1 is a graph used to explain the concept of the optical equivalent passband $N_e$, in accordance with the present invention;

Fig. 2 is an arrangement of apparatus for determining the optical equivalent passband $N_e$ of a lens, in accordance with the present invention;

Figure 5:
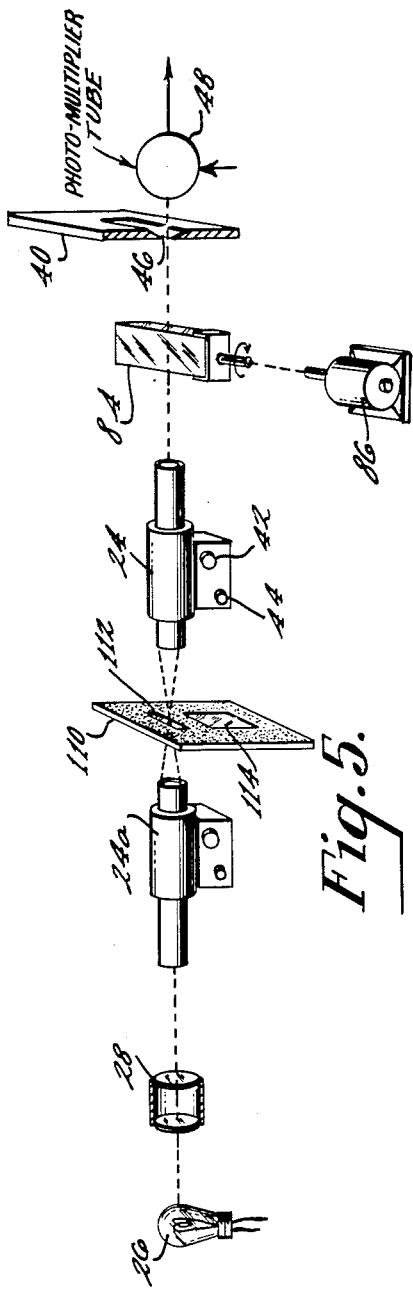
Figure 6:
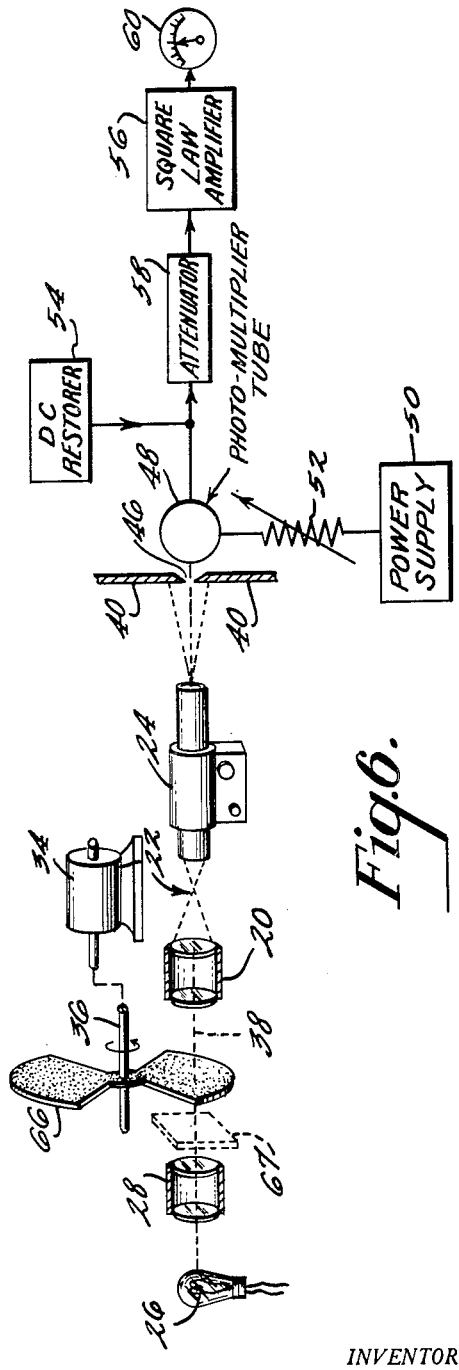

Figs. 3 (a) to (e) represent apparatus for deflecting a line-image, in accordance with the present invention;

Fig. 4 represents an arrangement of apparatus for measuring the optical equivalent passband $N_e$ of a cathode-ray tube, in accordance with the present invention;

Fig. 5 represents apparatus for measuring the optical equivalent passband $N_e$ of a photographic film, in accordance with the present invention; and Fig. 6 represents an arrangement for calibrating the apparatus of Fig. 2, in accordance with the present invention.

Referring now to Fig. 1, there is shown an aperture response curve, or sine-wave spectrum 10, of the type obtained from a lens, in accordance with the aforementioned method. Each point on the aperture response curve 10 represents the relative amplitude of the sinusoidal light intensity in the image of a sine-wave pattern of a particular line-number, the maximum amplitude obtained at a line number $N=0$ being unity. If each point on the aperture response curve 10 is squared, there is obtained an energy vs. line-number curve 12, hereinafter referred to as a sine-wave energy spectrum. The integral of the sine-wave energy spectrum 12 may be expressed as an area of a rectangle 14 wherein the ordinate is unity and the abscissa is a line-number, hereinafter designated as the optical equivalent passband $N_e$. The area under the curve 12, is, therefore, equal to the area of the rectangle 14.

Referring now to Fig. 2, there is shown an arrangement of apparatus for obtaining the optical equivalent passband $N_e$ of an optical device, such as a lens system 20, in accordance with the method of the present invention. Means are provided to form a line-image with the lens system 20 which is placed at the object plane 22 of a microscope 24. To this end, light from a light source 26 is condensed by a condenser lens system 28, and projected through one of a plurality of slots 30 formed in an opaque disc 32. The disc 32 is mechanically coupled to a motor 34, as indicated by a dashed line 36, for the purpose of the rotation of the disc 32 in the direction indicated by the arrow. Thus, it will be understood that each of the radially disposed slots 30 in the disc 32 will pass the principal ray 38 therethrough from the light source 26, when each of the slots 30 is in a horizontal position and aligned with the principal ray 38, looking at Fig. 2. The principal ray 38 is aligned with the optical axis of the lens system 20.

A disc 32 having a diameter of about 6 inches and comprising ninety slots 30, radially and uniformly disposed therein, has been found satisfactory. A width of 0.004" for each slot 30 has been found to give satisfactory results. The object distance should be made large enough so that the slots 30 approach a mathematical line-object and cause a fine line-image at the object-plane 22 of the microscope 24, after passing through the lens system 20.

The line-image at the object-plane 22 of the microscope 24 is focused onto an opaque screen 40 in the image plane of the microscope 24, by means of coarse and fine focusing knobs 42 and 44, respectively. The screen 40 is formed with a horizontal analyzing slit 46 therein, and aligned with the optical axis of the microscope 24. It will now be understood that as the disc 32 is rotated, successive magnified line-images resulting from light passing through each of the slots 30 are moved at a uniform velocity over the analyzing slit 46. A multiplier photo tube 48 is disposed directly behind the slit 46 and adapted to be energized by light passing therethrough. A power supply 50, for supplying operating voltages, is connected to the multiplier photo tube 48 through a variable resistor 52 which acts as a gain control for the output of the multiplier photo tube 48.

Output signals from the multiplier photo tube 48 are restored to a reference base-line, such as zero volts, by means of a D.-C. restorer circuit 54, of conventional design. The output of the multiplier photo tube 48 is applied to the input of a square-law amplifier 56 through a calibrated attenuator 58. The square-law amplifier 56 is of conventional design and is adapted to provide at its output a voltage whose amplitude is equal to the square of the voltage applied to its input. The output of the amplifier 56 is applied to a D.-C. meter 60 that is adapted to read the average value, that is, the integral of the output voltage signals from the square-law amplifier 56. The meter 60 may be calibrated in line numbers $N$.

The operation of the apparatus shown and described in Fig. 2 for measuring the optical equivalent passband $N_e$ of the lens system 20 will now be described. The source of light 26 is energized by connecting it to a D.-C. source of suitable operating voltage (not shown). The disc 32 is rotated at a uniform velocity by the motor 34, and illuminated by the light source 26 and the condenser 28 such that a complete line-image is formed by the lens 20. Successive line-images from each of the slots 30 of the disc 32, are, therefore, focussed on and passed at constant velocity over the object plane 22 of the microscope 24. The coarse and fine adjusting knobs 42 and 44 of the microscope 24 are manipulated to provide a magnified image of the line-image on the screen 40, disposed in the image plane of the microscope 24. It will now be understood that the line-image is moved at a uniform velocity over the analyzing slit 46. As a result of the light passing through the analyzing slit 46, a series of uniform electrical pulses, each having an amplitude corresponding to the line-image transmittance of the lens system 20, will be derived from the output of the multiplier photo tube 48. These output signals are restored to a zero voltage base-line by the D.-C. restorer 54, and may have the form illustrated by the waveform 62. The output of the multiplier photo tube 48, that is, the waveform 62, is applied over the attenuator 58 to the square-law amplifier 56. The output from the square-law amplifier 56 will now be a series of pulses 64 wherein each of the pulses has instantaneous amplitudes equal to the square of each of the pulse amplitudes of the waveform 62. The output of the square-law amplifier 56 is applied to the D.-C. meter 60 where each of the pulses of the waveform 64 is integrated and indicated. The reading so obtained on the meter 60 is proportional to the actual $N_e$ of the lens system 20.

The $N_e$ meter 60 may be calibrated to read the actual $N_e$ value of the lens system 20, and of other lens systems. For this purpose, the $N_e$ value of one lens system 20 must be determined mathematically. This is done by measuring the sine-wave spectrum of the lens 20, such as the curve 10 in Fig. 1, then squaring this curve to obtain the sine-wave energy spectrum curve, such as the curve 12, and integrating the area under the sine-wave energy spectrum curve 12. The length of the abscissa in line-numbers of a rectangle 14 whose ordinate is unity is the actual $N_e$ of the lens. The true value of $N_e$ thus determined is used to calibrate the $N_e$-meter 60. This may be accomplished by adjusting the instrument gain either by means of the variable resistor 52 and/or the attenuator 58 until the reading on the meter 60 corresponds to the true $N_e$ of the lens system 20. With the instrument thus calibrated, the $N_e$-value of lenses of similar magnification and identical light transmittance can be read directly on the meter 60. When, however, the lens under test has a light transmittance different from that with which the instrument was calibrated, for example, when it has a different $f$: -number it is necessary to readjust the gain of the instrument in inverse proportion to the light transmittance of the lens. This is accomplished by establishing a second reference reading.

Referring now to Fig. 6, there is shown an arrangement similar to Fig. 2, for the purpose of establishing this "reference"-reading on the $N_e$ meter 60, which is in effect a light transmittance measurement not involving resolution. The arrangement of apparatus in Fig. 6, is similar to that in Fig. 2, except that the disc 32 has been temporarily removed and a light chopper 66, similar to a motion picture shutter, has been put in its place. To obtain the second reference-reading on the $N_e$-meter 60, the light chopper 66 is rotated and the output signal of the system is adjusted by means of attenuator 58 or by inserting neutral density filters 67 into the light path until a reference reading of suitable magnitude such as a large deflection of the meter-$N_e$, is obtained from the lens with known $N_e$-value. The new setting of the attenuator 58 for the reference reading is noted as well as the particular density of the neutral filter 67, if used. Calibration of the system requires, hence, two steps as follows: First, set up the lens with known $N_e$ and adjust the multiplier photo tube gain control 52 and setting of the attenuator 58 to obtain the correct $N_e$-reading on the meter with the arrangement shown in Fig. 2. Now change over to the arrangement shown in Fig. 6 and adjust the light-intensity by the neutral filter 67 and/or the calibrated attenuator 58 to obtain a second convenient reference reading on the $N_e$-meter. This reading is independent of the resolution of the lens. Note the first attenuator setting when reading $N_e$ as the "read"-position and the second attenuator setting as the "calibrating"-position, which requires a neutral filter of particular value in the optical path. Now insert the lens to be tested using the calibrating arrangement shown in Fig. 6 with the neutral filter 67 and attenuator 58 in the "calibrating"-position. Adjust the setting of the multiplier gain control 52 until the reference reading established by the calibrated lens is again obtained. With the gain control 52 remaining at this setting, change over to the set-up in Fig. 2, remove the neutral filter 67 and reset the attenuator to the "read"-position. The $N_e$-meter is now in calibration, and the maximum reading obtained by focusing the microscope controls 42 and 44 is the $N_e$-value of the lens under test.

Referring now to Figs. 3 (*a*) to (*e*) there are shown a plurality of means, in addition to the slotted disc 32 of Fig. 2, for deflecting a line-image over the analyzing slit 46. In Fig. 3 (*a*), light from the source 26 is directed onto a plate 70 by the condenser 28. The plate 70 is formed with a horizontal slit 72 therein, aligned with the optical axis of the condenser 28. The plate 70 is fixed to a solenoid 74, in any suitable manner, so that it will be reciprocated up and down when an alternating voltage is applied to the coil of the solenoid 74. A constant 10 cycle alternating voltage has been found suitable to drive the solenoid 74.

In Fig. 3 (*b*), light from the source 26 is directed through the condenser 28 onto a mirror 76. The mirror is disposed within a hollow drum 78 formed with a plurality of vertical slots 80 therein. The mirror 76 is so disposed as to reflect light from the light source 26 through the slots 80. A motor 82 is mechanically coupled to the drum 78 to rotate it about its axis. With this arrangement for deflecting the line-image of the slots 80, it will be understood that the screen 40 will be oriented so that the analyzing slit 46 therein will be parallel to the slots 80 in the drum 78.

For analyzing photographic film and/or negatives, a line-image deflecting arrangement, such as shown in Fig. 3 (*c*), has been found satisfactory. A line-image projected through the microscope 24 is deflected by a glass cube 84 located on the optical axis of the microscope 24. A motor 86 is mechanically coupled to the cube 84 in a manner to rotate the cube 84 about an axis parallel to the slit 46 in the screen 40. With this arrangement, it will be understood that any line-image projected through the microscope 24 will scan the analyzing slit 46 in the screen 40 periodically.

Another means of deflecting a line-image across the analyzing slit 46 of the screen 40 is shown in Fig. 4 (*d*). In this arrangement a wheel 90, having a plurality of uniform mirrors 91 fixed to its periphery, is rotated by a motor 92. When the wheel 90 is rotated, each of the mirrors 91 will be disposed between the microscope 24 and the analyzing slit 46 in the screen 40 so as to deflect a line-image across the slit 46 periodically.

In Fig. 3 (*e*), a line-image projected through the microscope 24 may be deflected periodically across the analyzing slit 46 in the screen 40 by utilizing two fixed mirrors 94 and 96 and a movable mirror 98. The movable mirror is mounted on a solenoid 100 adapted to be reciprocated by a constant alternating voltage, of say 10 cycles per second. The mirror 98 is disposed with respect to the fixed mirrors 94 and 96 in a manner whereby light from the microscope 24 will be directed successively onto the mirror 94, then to the reciprocating mirror 98, then to the fixed mirror 96, and finally onto the screen 40. It will be understood that with the proper adjustment of the mirrors 94, 96 and 98, a line-image projected through the microscope 24 can be deflected periodically across the analyzing slit 46 in the screen 40.

Referring now to Fig. 4, there is shown an arrangement of apparatus for measuring the optical equivalent passband $N_e$ of a kinescope 102. The screen 104 of the kinescope 102 is disposed in the object plane of the microscope 24. Means are provided to produce a television raster on the screen 104 of the kinescope 102. To this end, a vertical deflection circuit 106 and a horizontal deflection circuit 108 are coupled to the kinescope 102, in a manner well known in the art. The vertical deflecting circuit 106 may provide deflection frequencies of 10 to 60 cycles per second; and the horizontal deflection circuit may provide a deflection frequency in the neighborhood of 32 kilocycles per second, for example. The arrangement of apparatus in Fig. 4 from the microscope on is the same as that shown and described in Fig. 2, except that the frequency bandwidth of the square-law amplifier is limited to exclude the horizontal deflection frequency, for example 32 kc., in a manner well known in the art.

The operation of the apparatus for measuring the optical equivalent passband $N_e$ of the kinescope 102, in accordance with the method of the present invention, will now be described. A small portion of the kinescope screen 104 that is scanned by the television raster thereon is disposed in the object plane 22 of the microscope 24. The simultaneous horizontal and vertical scanning of the electron beam (not shown) on the screen 104 of the kinescope 102 will produce a line-image moving over the object plane 22 of the microscope 24. This line-image is projected onto the screen 40 and will scan the slit 46 periodically, thereby producing a series of pulses at the output of the multiplier photo tube 48. The rest of the circuitry (not shown) connected to the multiplier photo tube 48 is the same as that shown in Fig. 2 except for a low-pass filter cutting off below the deflection frequency. Thus, it will be understood that the output signals from the multiplier photo tube 48 are restored to a reference voltage level, squared by a square-law amplifier, and then measured by a D.-C. meter to determine their average value. The reading on to $N_e$-meter 60, (Fig. 2) will be proportional to the true $N_e$ of the kinescope 102.

The meter 60, in Fig. 2, may be calibrated to read true $N_e$ values by using a kinescope 102 of known $N_e$. The second "reference"-reading, must again be independent of resolution, for example, it must be a reading controlled substantially by the light intensity of the kinescope screen. For this purpose, it has been found convenient to eliminate the definition of the kinescope under test as a factor by defocusing the microscope 24 by a fixed amount and/or temporary opening the slit 46 of the photo-tube to a large "reference" opening. The calibrating procedure is, hence, as follows: With a kinescope of known $N_e$-value in position, the microscope 24 in sharp focus, and a normal fine slit width 46, the gain control 52 (Fig. 2) and the attenuator 58 are adjusted to obtain the correct $N_e$-reading on the meter 60. The microscope 24 is now defocused by a fixed amount, for example, by changing its objective to a lower power objective which is not parfocal, and the slit 46 is opened to a reference opening giving a convenient reference reading on the meter 60.

A different kinescope may now be tested by first setting the vertical deflection amplitude to the same value, adjusting its beam current to any desired value and then adjusting the gain control 52 with the microscope defocused and wide reference opening of the slit 46 to obtain the reference reading on meter 60. After this adjustment, the slit is closed to its normal operating position and with the microscope in sharp focus, the meter 60 will now indicate the correct $N_e$-value.

It is obvious that kinescope screen materials with a long decay time constant require that the vertical deflection frequency (pulse repetition rate) be decreased to appropriately less values or that the photo-tube amplifier circuit be compensated for the phosphor decay (as in flying spot scanners). As an example, the decay of normal white kinescopes with sulfide screens requires a 20 cycle field frequency for linear amplifiers.

The optical equivalent passband $N_e$ of a photographic film 110, as illustrated in Fig. 5, may be measured by an arrangement of apparatus substantially similar to that shown and described in Fig. 2. The film 110 is prepared by exposure to a fine line object. It is obvious that the contrast of the line-object as well as the exposure may be varied to obtain line-images 112 of different contrast and at different density levels of the negative. These parameters cause, therefore, variations in the transmittance of the exposed film and require that a large rectangular reference field 114 with sharp edges parallel to the line-object, and having the same contrast and luminance level as the line-object, be photographed simultaneously with the line-object. The arrangement of apparatus for $N_e$-measurements of film 110 is shown in Fig. 5 and differs from Fig. 2 in that an additional microscope 24a, without an eye piece, is used as a condenser to illuminate the object plane 22 of microscope 24 adequately.

$N_e$-values are measured by inserting a calibrated film 110 with known $N_e$ in plane 22, and focusing the line-image 112 on the film sharply by means of microscope 24 onto the slit 46 which is indicated by a maximum reading of the $N_e$-meter, the gain control 52 and the attenuator 58 being adjusted to obtain the correct $N_e$-reading. The calibrated film 110 is now moved in plane 22 such that one edge of the above-mentioned rectangular reference field 114 lies on the microscope axis, so that deflection by the glass cube 84 produces a substantially square wave output signal from the multiplier photo tube 48 which is the desired transmittance reference reading. The gain of the system is adjusted again as in the case of lens testing by means of the attenuator 58 and/or a neutral filter 67 of suitable density in the light path, to obtain a convenient reference reading. Any other film can now be measured by first establishing this reference reading with the neutral filter 67 in place and the attenuator in this last-mentioned calibration position by adjusting the gain control 52; and then moving the line-image of the film onto the optical axis of the microscope 24, removing the neutral filter and resetting the attenuator to the "read"-position as described for lens testing.

What is claimed is:

1. Apparatus for measuring the optical equivalent passband $N_e$ of an optical device comprising means for cooperating with said device to form a plurality of successive line-images, means to convert said line-images into a first series of uniformly spaced electrical impulses, means to derive from said first series of electrical impulses a second series of electrical impulses having intensities equal to the square of said first series, and means to measure said second series of electrical impulses.

2. Means for measuring the optical equivalent passband $N_e$ of an optical device comprising a lens system having an image plane and an object plane, means for cooperating with said lens system to form a plurality of successive optical line-images at said object plane, an opaque screen substantially in said image plane, said screen being formed with a slit aperture extending in a direction parallel to the direction of said line-images, means to move said line-images at a uniform velocity in a direction substantially perpendicular to said slit aperture whereby to scan said slit aperture with light from said line-images, means to derive a first series of electrical impulses from the light passing through said slit aperture, means to square said first series of electrical impulses, and means to measure the average value of said squared electrical impulses.

3. In combination, an arrangement of apparatus for measuring the optical equivalent passband $N_e$ of an optical device comprising means for cooperating with said device to form a plurality of successive uniformly spaced optical line-images, photosensitive means to convert said line-images into a first series of electrical impulses, means including a square-law amplifier to derive from said first series of electrical impulses a second series of electrical impulses having an intensity equal to the square of said first series, and means connected to said square-law amplifier to indicate the average value of said second series of squared electrical impulses.

4. Apparatus for measuring the optical equivalent passband $N_e$ of a lens system comprising a source of light energy, an opaque disc formed with a plurality of relatively narrow slots radially and uniformly disposed therein, a screen formed with a slit aperture therein, means to rotate said disc between said light source and said lens system to project images of said slots successively onto said screen whereby to project line-images of said slots through said aperture slit, means comprising a photosensitive element to convert light passing through said aperture slit into a series of electrical impulses, a square-law amplifier having an input and an output, means connected to the output of said photosensitive element to restore said electrical impulses to a reference voltage level, means to apply said restored electrical impulses to the input of said square-law amplifier whereby to square said electrical impulses, a D.-C. voltmeter, and means to apply the output of said square-law amplifier to said D.-C. meter to indicate the average value of the output of said squared electrical pulses.

5. Means for measuring the optical equivalent passband $N_e$ of an optical device comprising a lens system having an image plane and an object plane, means for cooperating with said lens system to form a plurality of successive optical line-images at said object plane, an opaque screen substantially in said image plane, said screen being formed with a slit aperture extending in a direction parallel to the direction of said line-images, means to scan said slit aperture of said screen at a uniform velocity with said line-images, means comprising a photosensitive element disposed to receive light passing through said slit aperture whereby to derive electrical impulses therefrom, means to restore said electrical impulses to a common reference base-line, a square-law amplifier having an input and an output, means connecting the input of said square-law amplifier to said D.-C. restoring means to apply said restored electrical impulses thereto, and indicating means connected to said output of said square-law amplifier to indicate the average value of the output of said square-law amplifier.

6. Apparatus for measuring the optical equivalent passband $N_e$ of a cathode-ray tube having means to scan an electron beam in a manner to provide a raster on the face thereof; said apparatus comprising a lens system having an object plane and an image plane, an opaque screen substantially disposed in said image plane, said opaque screen being formed with a slit therein, said lens system comprising means to focus a portion of the raster on said face of said cathode-ray tube when said face is disposed substantially in the object plane of said lens system, means to convert light passing through said slit of said screen into a first series of electrical impulses, means to derive from said first series of electrical impulses a second series of electrical impulses having an intensity equal to the square of said first series of electrical impulses, and means to measure the average value of said second series of electrical impulses.

7. Apparatus for measuring the optical equivalent passband $N_e$ of a film having an optical line-image photographed thereon comprising a lens system having an image plane and an object plane, an opaque screen disposed in the image plane of said lens system, said opaque screen being formed with a slit therein, means to project said line-image on said opaque screen when said film is disposed in said object plane, means to move said line-image at a uniform velocity across said slit whereby to scan said slit periodically with light from said line-image, means to derive a first series of electrical impulses from the light passing through said slit, means to square said first series of electrical impulses, and means to measure the average value of said squared electrical impulses.

8. A method of measuring the optical equivalent passband $N_e$ of an optical device comprising the steps of forming a plurality of successive optical line-images with said device, converting said line-images into a first series of electrical impulses, squaring said first series of electrical impulses and deriving a second series of electrical impulses therefrom, and measuring the average value of said second series of electrical impulses.

9. A method of measuring the optical equivalent passband $N_e$ of an optical device comprising the steps of forming a plurality of successive optical line-images with said device, converting said line-images into a first series of electrical impulses, deriving from said device a reference signal which is substantially proportional to its light transmittance and independent of its resolution, adjusting the amplitude of each of said first series of electrical impulses in an inverse proportion to the amplitude of said reference signal, squaring said first series of adjusted electrical impulses and deriving therefrom a second series of electrical impulses, and measuring the average value of said second series of electrical impulses.

No references cited.